United States Patent [19]

Fredres

[11] 4,445,072
[45] Apr. 24, 1984

[54] CRT DEGAUSSING SYSTEM

[75] Inventor: Robert Fredres, Aurora, Ill.

[73] Assignee: Motorola, Inc., Schaumburg, Ill.

[21] Appl. No.: 426,574

[22] Filed: Sep. 29, 1982

[51] Int. Cl.³ .............................................. H01F 13/00
[52] U.S. Cl. ......................................... 315/8; 361/150
[58] Field of Search ..................... 315/8, 85; 361/150, 361/267

[56] References Cited

U.S. PATENT DOCUMENTS

| | | | |
|---|---|---|---|
| 3,872,347 | 3/1975 | Matsushima et al. | 315/8 |
| 3,879,633 | 4/1975 | Stark, Jr. | 315/8 |
| 3,896,330 | 7/1975 | Chamberlain | 315/8 |
| 3,982,153 | 9/1976 | Burdick et al. | 315/8 |

FOREIGN PATENT DOCUMENTS 2025174 12/1971 Fed. Rep. of Germany .......... 315/8
57-26982 2/1982 Japan ..................................... 315/8

Primary Examiner—Eugene R. Laroche
Attorney, Agent, or Firm—Margaret M. Parker; James W. Gillman; James S. Pristelski

[57] ABSTRACT

A degaussing system in a CRT device detects a trigger pulse and provides a timed control pulse which controls a power circuit "on" time. The power supplied to the degaussing coil is gradually reduced by the increasing resistance of a PTC thermistor in series with the degaussing coil, then turned off by the end of the control pulse. Degaussing can be initiated manually or automatically as often as desired, and may be triggered automatically in response to a predetermined period of device inactivity.

5 Claims, 1 Drawing Figure

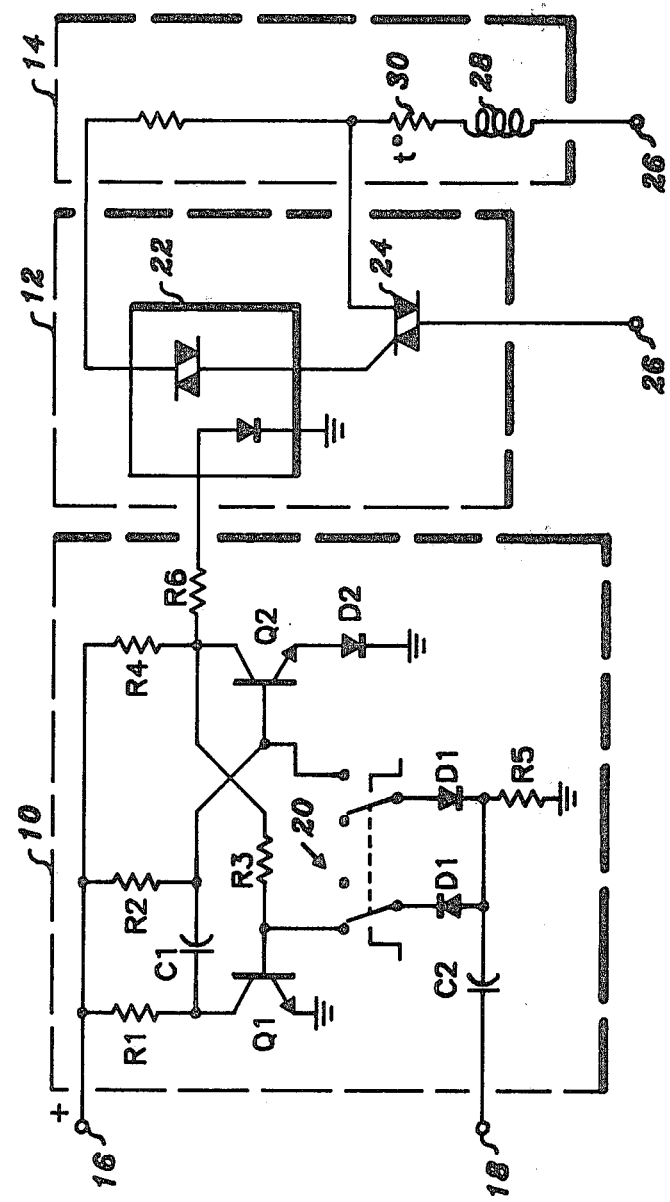

CRT DEGAUSSING SYSTEM CL CROSS REFERENCE TO RELATED APPLICATION

This application is related to a co-pending application, Ser. No. 426,570, filed as of even date and assigned to the same assignee.

BACKGROUND OF THE INVENTION

This invention relates to the field of cathode ray tube degaussing and, more particularly, to an inexpensive and power-efficient degaussing circuit.

It is well known in the art of CRT's having three electron beams for color reproduction that small amounts of magnetization in the metal parts of the tube can affect the purity of the colors. A very weak magnetic field near an electron beam can produce a deflection error sufficient to cause the beam to strike phosphor dots for which it was not intended. Many types of arrangements have been used in the manufacture of CRT devices for optimizing color purity including locating permanent magnets in or near the convergence yoke assembly, varying the direction of the magnets in a magnetic field equalizer assembly, and adjusting the deflecting yoke axially. Typically, when a CRT device is moved with respect to the direction of the earth's magnetic field, color purity must be readjusted. Degaussing coils have been placed around the periphery of the face plate or around the conical portion of the CRT for demagnetizing portions of the CRT structure which become magnetized during use.

Since energizing of a degaussing coil would cause a noticeable flash on the phosphor screen, degaussing is usually done as the CRT device is turned on and before the electron beam is on. This mode of operation is usually satisfactory for apparatus in the home, such as television sets, but in industrial or business environments there may be relatively strong magnetic fields at frequent intervals due to such things as starting electric motors and the like which severely affect color purity. In some CRT devices, the whole device is shut down manually when degaussing become necessary, but an unwanted shutdown may be less desirable than some color impurity and generally causes loss of data in a data terminal.

Some degaussing control circuits have used a positive temperature coefficient (PTC) resistor in series with the degaussing coil, but since the resistance of a PTC resistor does not become infinite, some current continues to flow in the coil circuit. This current is typically sufficient to keep the resistor warm and, therefore, the degaussing cycle cannot be repeated until the CRT device has been turned off and the resistor allowed to cool. Other circuits utilize combinations of voltage dependent resistors (VDR) and NTC thermistors in order to control the degaussing current. One such circuit puts a second NTC thermistor in series with the first when it is desired to degauss during CRT use but this, too, is expensive.

SUMMARY OF THE INVENTION

It is, therefore, an object of the present invention to provide an improved means for degaussing a CRT.

It is a particular object to provide a simple and inexpensive circuit for degaussing.

These objects and others which will be apparent are obtained in a degaussing arrangement in accordance with the present invention in which a control circuit provides a control signal of a predetermined length in response to an input trigger signal. The trigger signal may be manually activated or automatically supplied as by a microprocessor and software as in the above-referenced co-pending application. The control signal controls a power circuit which provides current for the degaussing coil. In series with the coil is a positive temperature coefficient thermistor for reducing the degaussing current after flow begins. The end of the control signal pulse cuts off all current to the degaussing circuit, without powering-down the entire CRT device.

BRIEF DESCRIPTION OF THE DRAWING

The sole drawing FIGURE is a schematic diagram of the preferred embodiment of the invention.

DETAILED DESCRIPTION OF THE PREFERRED EMBODIMENT

In the CRT device with which the present invention was designed to function, the CRT screen displays information in the form of alphanumeric characters or as graphic displays. The information may be inputted by a keyboard at the CRT device or as by a transmission line from a main computer. The CRT will normally be a three-gun tube, typically operating in an industrial or commercial environment. Due to the likelihood of strong magnetic fields in the adjacent areas, the CRT device will likely require degaussing more frequently than just at turn-ons. As described in a co-pending patent application Ser. No. 426,570, a "dimming" cycle is initiated after twenty minutes of inactivity to avoid "burn-in" of the screen. If such a "dimming" signal is present it would be desirable to use that signal to initiate degaussing, since it is preferable to degauss when the screen is not illuminated. Any signal, and whether initiated manually or automatically, will suffice to again brighten the displayed data or graphics when degaussing is complete.

The circuit shown in the FIGURE is a preferred embodiment of the invention, but the invention is not to be construed as limited thereto. As indicated by the dashed lines, the circuit may be considered to contain three main portions, a control circuit 10, a power circuit 12 and degaussing circuit 14.

The control circuit 10 includes two transistors Q1, Q2, which with associated resistors R1, R2, R3, R4 and capacitor C1 form a one shot multivibrator with power supplied from a terminal 16. A positive-going signal level change at an input terminal 18 is coupled through a capacitor C2 and a diode D1 to the base of Q1. It is to be noted that if it is desired to trigger the monostable on a negative-going signal, the diode D1 would be reversed and the diode cathode would be coupled to the base of Q2. This signal option is indicated symbolically by a DPDT switch 20. A resistor R5 is coupled to allow discharge of the capacitor C2. A diode D2 is coupled between the emitter of Q2 and ground. Each output pulse will be initiated by a signal level change at the terminal 18, but will always have a predetermined length as determined by component values and regardless of the signal at terminal 18. The specific circuit shown in the dashed line referenced 10 could be replaced by an integrated circuit timer of the type commonly known as a "555".

A resistor R6 couples the control circuit output pulse to a triac opto-isolator 22 in the power circuit 12. The triac opto-isolator may be a MOC-3011 and serves to isolate the control signals from the AC power. A power triac 24 in the power circuit 12 is controlled by the triac in the triac opto-isolator 22 and, in turn, controls the AC power supplied to the degaussing circuit 14. Power is supplied via a pair of AC terminals 26 and is coupled to the power triac 24, to a degaussing coil 28 and to a positive temperature coefficient (PTC) thermistor 30.

Whenever the CRT is to be degaussed, the monostable in the control circuit 10 is triggered by the signal as received at the terminal 18 and, after a timed interval determined by the component values in the circuit 10, the monostable resets itself. During the timed interval, the opto-isolator 22 is on and the power triac 24 is activated. At the beginning of the timed interval, AC current at a relatively high level is allowed to flow through the degaussing coil 28 and the thermistor 30. The coil 28 could be any suitable coil configuration which would produce a strong enough magnetic field within the CRT. As is known, demagnetization is best accomplished by putting the magnetized object in a magnetic field which alternates polarity rapidly and which gradually diminishes to essentially zero field strength. The latter characteristic may be achieved by weakening the field gradually or by slowly separating the object and the field. In the present instance the thermistor 30 controls the strength of the field. The PTC type thermistor has a relatively low resistance when cold, thus allowing a heavy initial flow of current through the degaussing coil. As the thermistor is heated by that current, thermistor resistance rises sharply, reducing current flow to a minimum. The particular thermistor chosen will depend on the expected voltages and the desired current values in the specific embodiment. At the end of the interval timed by the monostable, the opto-isolator 22 is turned off, the power triac 24 is turned off, and no current is supplied to the coil 28. The timed interval in this application may be on the order of 1 to 2 sec. Since the PTC type thermistor will cool fairly rapidly, having no current flowing through it, degaussing can be repeated as desired.

Thus, there has been shown and described a relatively simple and inexpensive but effective circuit for degaussing of a cathode ray tube. Degaussing may be initiated automatically or manually, as often as desired, with no shutdown of the device required. Other variations and modifications of the invention are possible and it is intended to cover all such as fall within the spirit and scope of the appended claims.

What is claimed is:

1. A degaussing system in a CRT device and comprising:
   an input means for receiving a trigger signal;
   a control circuit coupled to the input means for providing a control signal pulse of a predetermined length in response to the trigger signal and including a multibrator circuit coupled to be triggered by a predetermined level change in the trigger signal and which will automatically reset itself for being retriggered by a repeat of the predetermined level change;
   a degaussing circuit including in series a degaussing coil and a resistance element having a high positive temperature co-efficient; and
   a power circuit coupled to the control circuit for supplying power to the degaussing circuit in response to the control signal.

2. A degaussing system according to claim 1 and wherein the predetermined length of the control signal pulse is determined by the component values in the multivibrator.

3. A degaussing system according to claim 1 and wherein the resistance element in the degaussing circuit is a thermistor.

4. A degaussing system according to claim 1 and wherein the power circuit includes an isolating element.

5. A degaussing system according to claim 4 and wherein the isolating element includes an opto-isolator.

* * * * *